US007574571B2

(12) United States Patent
Batcher

(10) Patent No.: US 7,574,571 B2
(45) Date of Patent: Aug. 11, 2009

(54) HARDWARE-BASED ENCRYPTION/DECRYPTION EMPLOYING DUAL PORTED MEMORY AND FAST TABLE INITIALIZATION

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 11/289,797

(22) Filed: Nov. 30, 2005

(65) Prior Publication Data

US 2006/0078108 A1   Apr. 13, 2006

Related U.S. Application Data

(62) Division of application No. 10/016,392, filed on Dec. 10, 2001, now Pat. No. 6,980,649.

(51) Int. Cl.
*G06F 12/16* (2006.01)
*H04L 9/00* (2006.01)

(52) U.S. Cl. .......................... 711/156; 711/141; 380/42

(58) Field of Classification Search ....................... None
See application file for complete search history.

(56) References Cited

U.S. PATENT DOCUMENTS 4,890,223 A * 12/1989 Cruess et al. ............... 711/207
6,460,054 B1 * 10/2002 Grummon ................... 707/204
6,684,305 B1 *  1/2004 Deneau ...................... 711/159

* cited by examiner

*Primary Examiner*—Than Nguyen
(74) *Attorney, Agent, or Firm*—Tucker Ellis & West LLP

(57) ABSTRACT

A system for the encryption and decryption of data employing dual ported RAM to accelerate data processing operations during the computation of the encryption and decryption algorithm. The system includes logic to track data changes in the dual ported memory for fast table initialization; a means to accelerate operations by performing read/write operations in different iterations of the algorithm to separate ports on the dual ported RAM in the same clock cycle; and a means to resolve data manipulation conflicts between out of order read/write operations so that the system correctly computes the desired algorithm.

20 Claims, 3 Drawing Sheets

HARDWARE-BASED ENCRYPTION/DECRYPTION EMPLOYING DUAL PORTED MEMORY AND FAST TABLE INITIALIZATION

CROSS-REFERENCE TO RELATED APPLICATIONS

This application is a divisional application of U.S. application Ser. No. 10/016,392 filed on Dec. 10, 2001 now U.S. Pat. No. 6,980,649.

FIELD OF THE INVENTION

The present invention generally relates to a system for encryption and decryption of data, and more particularly to a hardware-based encryption and decryption system employing a dual ported memory table and a method for fast table initialization.

BACKGROUND OF THE INVENTION

In a typical wireless LAN configuration, a common model for network processing consists of a multi-level approach. This is common in many Ethernet LAN protocols such as IEEE 802.3. The model typically includes 3 major levels, namely a) Top: Logical-Link control; b) Middle: Medium Access Control (MAC); and c) Bottom: Physical interface (PHY).

A wireless LAN configuration compliant to IEEE 802.11 is similar to its wired counterpart and has the same three levels. Traditionally, the top Logical-Link control tasks are handled by software running on a HOST processor. The middle level is the responsibility of a MAC processor, which handles all frame traffic between the HOST and the PHY level.

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms.

Data transferred between the PHY processing device and the MAC processing system (i.e., the PHY data stream) may be encrypted using an encryption algorithm, such as RC4 WEP (Wired Equivalent Privacy), the current standard for IEEE 802.11 wireless LAN. This privacy method makes it difficult for an eavesdropper listening to a wireless communication session between two authenticated stations to discover the contents of the data or recover the private encryption key. Data privacy is extremely important with wireless LANs due to the open nature of the network. Encrypted data received by the MAC processing system from the PHY processing device is initially stored to the main memory as encrypted data. At a later time, the MAC processor reads the stored encrypted data from main memory and decrypts the data, recovering the plaintext. The decrypted data is then written to the main memory for subsequent processing by the HOST processor.

Similarly, in the case of a data transmission from the MAC processor to the PHY data processing device, the data originates from the HOST processor that writes the data as plaintext to the main memory. The MAC processor will at a later time read the data from the main memory and encrypt it, using the same encryption algorithm (e.g., RC4 WEP). Then the encrypted data is transmitted to the PHY processing device.

Encryption algorithm RC4 (developed by RSA Data Security, Inc.) is used to encrypt data using a variable key-size stream cipher with byte-oriented operations. The algorithm is based on the use of a random permutation. Analysis shows that the period of the cipher is overwhelmingly likely to be greater than $10^{100}$. Eight to sixteen machine operations are required per output byte, and the cipher can be expected to run very quickly in software. RC4 is commonly used for file encryption and for secure communications, as in the encryption of traffic to and from secure web sites using the secured socket layer (SSL) protocol.

In the prior art, both software and hardware approaches have been used to implement the private key RC4 algorithm. In the case where all operations are performed in software, a simple C program can be used, such as those illustrated herein. The RC4 algorithm can be divided into three basic phases: phase 1 for lookup and loading of a private key; phase 2 having two parts, namely, phase 2a for filling an S-box table linearly and phase 2b for initializing the S-box table with the private key; and phase 3 for the encrypting/decrypting operation (including determination of an X byte and an XOR operation). The S-box is a common term used to describe an array of bytes which permutates to different values during a streaming encryption algorithm. The S-box maintains the state of the encryption algorithm while it runs.

It should be understood that Phase 2 of the algorithm includes the two steps of: (phase 2a) filling an S-box table (256×8 memory) linearly: $S_0=0$, $S_1=1$, . . . ,$S_{255}=255$; and then (phase 2b) initializing the S-box table by scrambling the table with the private key, repeating the key as necessary to address all 256 locations in the array. For example, if a 16 byte key is used, the sequence would be: $KEY_0, KEY_1, \ldots, KEY_0, KEY_{15}, KEY_1, \ldots, KEY_{15}$. repeating this sequence a total of 16 times to complete the scrambling. It should be appreciated that the term "key" refers to a plurality of "key values." In accordance with a preferred embodiment, each key value is a byte, and a key is comprised of 16 key values (i.e., 16 bytes or 128-bit encryption). The key is a private key known only to the transmitter and receiver(s) of the encrypted data.

As indicated above, in Phase 2b of the RC4 algorithm the S-box table is initialized with the private key. In this regard, index j is set to zero, then:

For i=0 to 255:

$j=(j+S_i+KEY_i) \bmod 256$ swap $S_i$ and $S_j$

In the third phase (phase 3), two counters, i and j, are initialized to zero to index through the 256×8 S-box in a pseudorandom fashion. Thereafter, random bytes X are generated as follows:

$i=(i+1) \bmod 256$ $j=(j+S_i) \bmod 256$

Swap $S_i$ and $S_j$ $t=(S_i+S_j) \bmod 256$ $X=S_t$

The foregoing code sequence of this third phase is performed for every byte to be encrypted/decrypted. Being a symmetric cryptosystem, the same algorithm is used to decrypt or encrypt data depending on how the XOR data is used. In this regard, the byte X is XORed with plaintext to produce ciphertext or XORed with ciphertext to produce plaintext.

Although the software implementation of the foregoing encryption algorithm appears simple in high level code, the software approach is too slow to meet the tight turn around time requirements of IEEE 802.11. With high data rates especially during short packet scenarios, the receiving station does not have time to decrypt the data before the next packet arrives since there is very little time in between reception of frames. Often, the receiver is forced to either drop back-to-back receive packets, or at least save the ciphertext into external memory, where it can be decrypted later, so that turn around times can be met. Short packets are especially troublesome since the receiver does not have time to recover the up front cost of the table initialization during the short payload reception time.

In view of the deficiencies of the software implementation, hardware modifications to the MAC processor have been used to accelerate operation of the algorithm. These solutions are designed to improve the run time of the hardware implementation for all phases of the WEP operation. With current 802.11 speeds, these approaches have helped the receiving stations efficiently process receive packets without dropping packets. However, data processing speed is not fast enough, and thus it has still been necessary to offload the ciphertext to external memory for later decryption. This is inefficient and adds to packet processing latency, since the HOST processor cannot process the data until it has been decrypted by the MAC processor.

In the future, this processing speed problem will only get worse as data rates get higher and higher with the emergence of the derivative IEEE 802.11 A standard. This new standard has data rates up to 54 MB/s using a PHY modulation standard known as Orthogonal Frequency Division Multiplexing (OFDM). IEEE 802.11 A involves upfront processing by the PHY processing device, which leaves even less time to the MAC processor for packet turnaround processing (e.g., 4 to 8 microseconds). Furthermore, quality of service (QOS) initiatives of emerging 802.11 standards will further reduce the time available to the MAC processor to deal with decryption packet processing. Packet latency time from the PHY processing device to the HOST processor is also an issue with high quality of service applications which demand bounded and predictable delay between two stations.

Referring now to FIG. 2, there is shown a MAC processor 10 according to the prior art. MAC processor 10 is generally comprised of a CPU 20, a key register 30, a data path hardware engine 40, a microcode controller system 50 (which includes a microcode controller and RAM), and an S-Box RAM 100.

CPU 20 is the main processing device of MAC processor 10, and provides signals for controlling operation of key register 30 and microcode controller system 50. Keys are commonly stored in "off-chip" RAM since they are large (often 128 bits or more), and there are many keys that might be used to decrypt and encrypt data depending on the source and destination of the packet address. Therefore, in the prior art a small on-chip key register 30 is used to hold the current key bytes being used. Key register 30 is loaded by using register decodes under the direction of software. Therefore, once the proper key is found for a received packet, software can load the key and start phase 2 of the encryption algorithm discussed above. Data path hardware engine 40 provides an 8-bit wide data path for performing data manipulation for the RC4 algorithm. Data path hardware engine 40 includes elements such as registers, adders, multiplexers, etc., used to read key register 30 and read/write the S-box table RAM 100. Microcode controller system 50 is used to control the data path to execute the operations needed to execute the RC4 algorithm. S-box table RAM 100 is an "on-chip" RAM (i.e., RAM located on the MAC processor chip) which stores the S-box table. The use of an "on-chip" RAM allows for faster initialization and XOR byte generation than obtained with off-chip memory access.

By using the above-mentioned hardware, the prior art takes a total of 1280 (R/W) microcode operations in order to perform the initialization of the S-box table. In addition, the prior art requires that key loading is totally complete before starting the phase 2b initialization operation. However, phase 2a can be executed at any time since the linear fill of the S-box table does not depend on the key. It should be understood that phase 2a must complete before launching phase 2b.

The present invention provides enhancements to the hardware controller and implementation in order to further improve the speed of the encryption/decryption operations. The new approach uses a hardware based state machine instead of microcode along with a fast table initialization method to rapidly prepare and encrypt the RC4 operations.

SUMMARY OF THE INVENTION

According to the present invention there is provided a system for expedited encryption and decryption operations including a first dual port memory for storing in consecutive order a plurality of keys respectively associated with a plurality of data frames including encrypted data, wherein each said key is comprised of a plurality of key values; a second dual port memory for storing permuting data values for decryption; a bit table for tracking data modifications within the second dual port memory; and a controller for executing a decryption algorithm wherein a plurality of data values are read concurrently from the second dual port memory to determine a plurality of index values, and a plurality of pairs of data values stored in the second dual port memory are respectively swapped concurrently within the second dual port memory, said plurality of pairs of data values identified by said plurality of index values. The controller contains a means of controlling the data path and dual ported memory so that conflicts between simultaneous overlapping operations are resolved.

An advantage of the present invention is the provision of a system for encryption/decryption that provides faster and zero cost execution of the initial s-box table initialization process (phase 2a) for an encryption/decryption algorithm.

Another advantage of the present invention is the provision of a system for encryption/decryption that provides faster and more efficient execution of the s-box table initialization process using a private key (phase 2b) for an encryption/decryption algorithm.

Still another advantage of the present invention is the provision of a system for encryption/decryption that provides faster and more efficient execution of the XOR processing (phase 3) for an encryption/decryption algorithm.

Still another advantage of the present invention is the provision of a system for encryption/decryption that provides greater ease of operation with minimal firmware/software interaction.

Yet another advantage of the present invention is the provision of a system for encryption/decryption that reduces power consumption.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be understood that while a preferred embodiment of the present invention is described in connection with the RC4 encryption/decryption algorithm, the present invention is also suitably applicable to provide improved processing speed and efficiency for other encryption/decryption algorithms that use state tables. Moreover, it is contemplated that the present invention has applications outside of data encryption/decryption, as a means for accelerating data processing operations.

Figure 1:
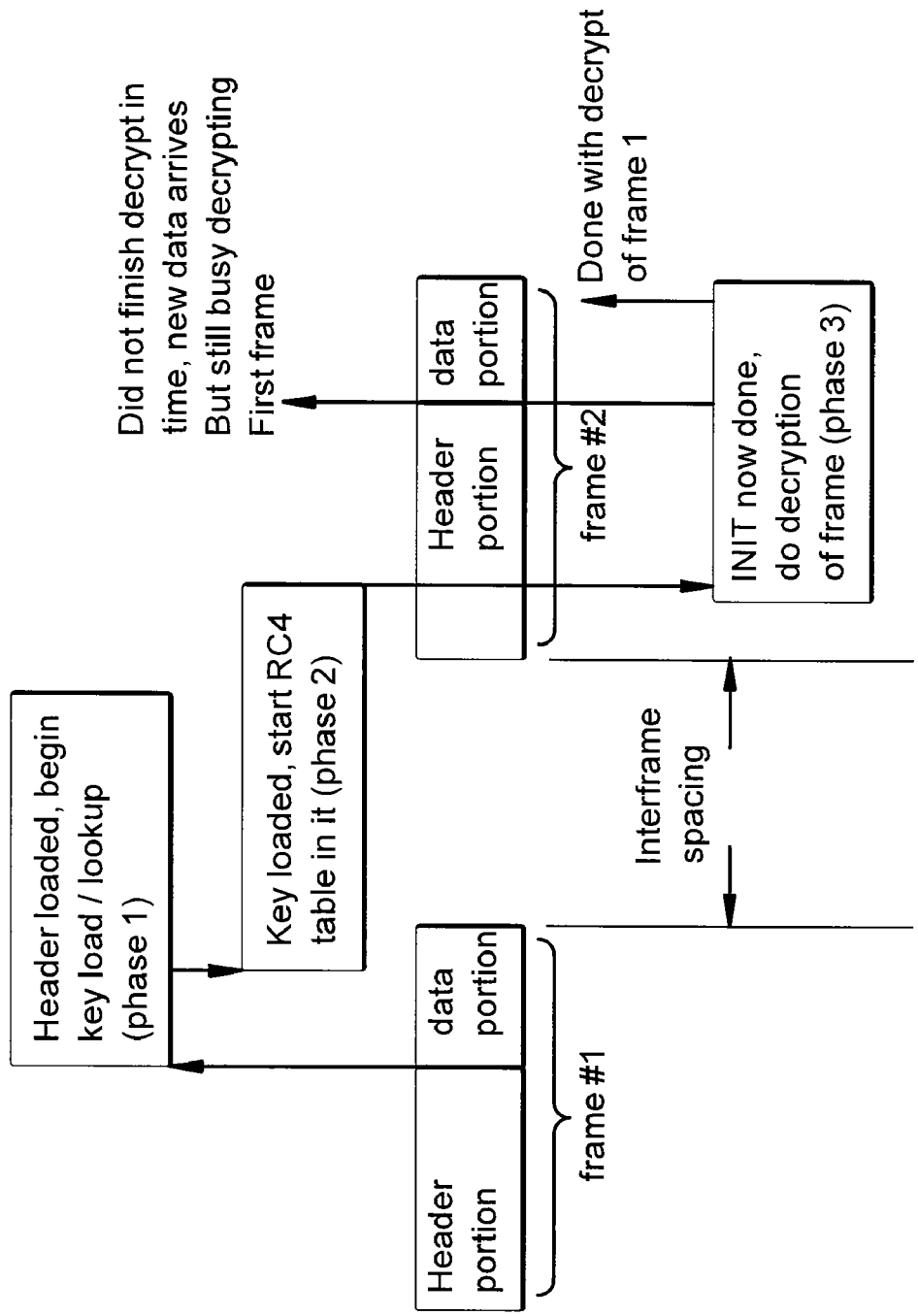
FIG. 1 illustrates a typical PHY data stream.

Referring now to the drawings wherein the showings are for the purposes of illustrating a preferred embodiment of the invention only and not for purposes of limiting same, FIG. 1 illustrates a typical PHY data stream. The PHY data stream include data frames having two main components, namely, a header portion and a data portion. The header portion includes control information such as source, destination address; data rate, etc. The MAC processor processes the header information so it knows how to deal with the data portion. Furthermore, some information in the header portion may direct the MAC processor to perform actions such as generating a response message to the sender or steering the data to another station. The header portion is not typically encrypted. The data portion typically includes data that is encrypted, and is intended for processing by the HOST processor. This data may be used by the HOST processor to communicate with other HOST processors across a network using some upper level protocol, such as sending an FTP (Ethernet File Transfer Protocol) from one station to another station. In the case of a system complying with IEEE standard 802.11, the HOST processor does not use the header information.

Figure 2:
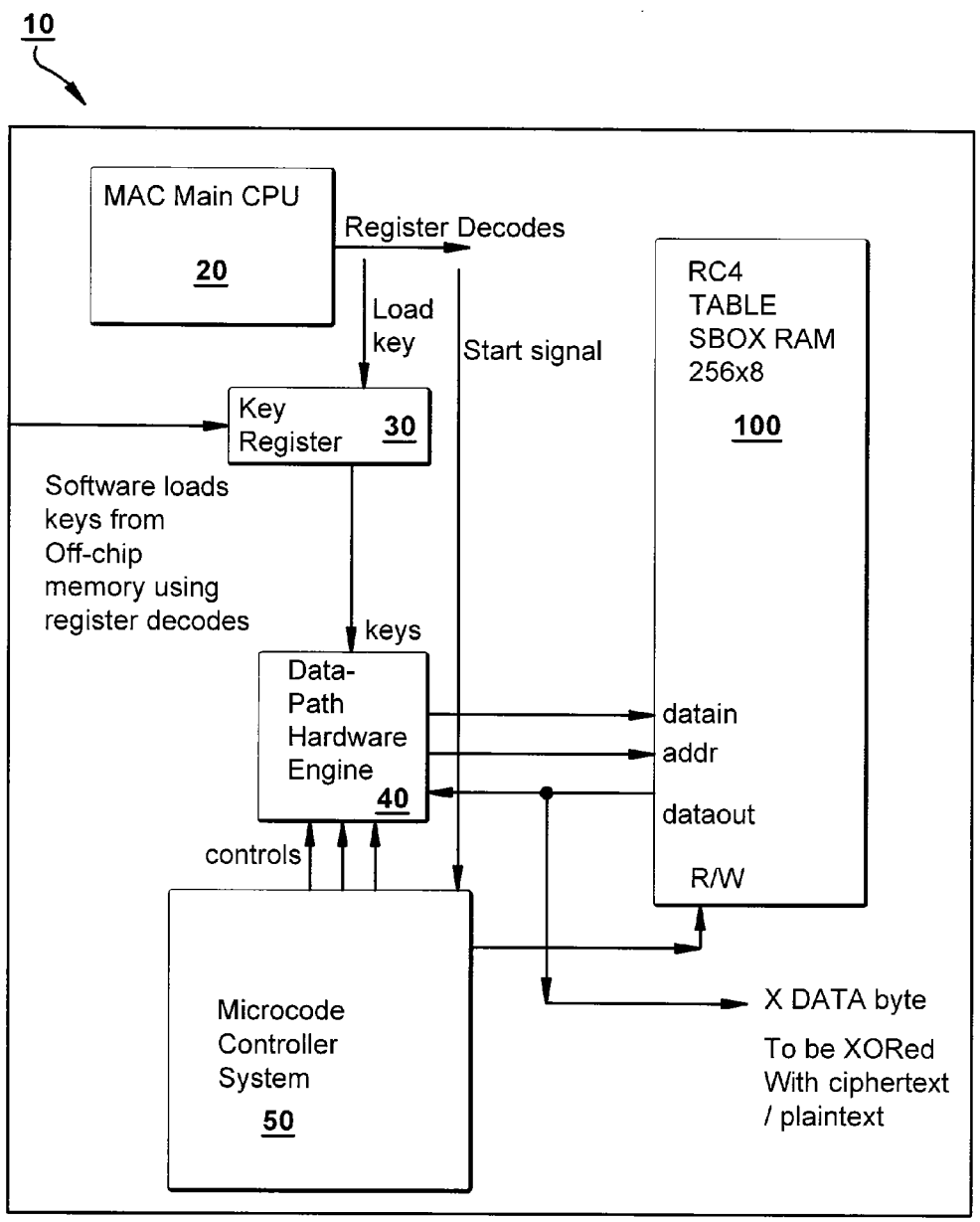
FIG. 2 is a block diagram of a typical prior art hardware configuration for performing encryption/decryption.

The data processing steps for decryption using prior art systems will now be described in detail with reference to FIGS. 1 and 2. As can be seen in FIG. 1, each frame of data is comprised of a header portion and a data portion. A short time gap (i.e., interframe spacing) is provided between each frame. After the header portion of the first data frame (frame #1) has been loaded, phase 1 of the RC4 algorithm commences. The address portion of the header is used to begin the key lookup. After the proper key is found, it is loaded into the key register. While this is happening, encrypted data continues to arrive from the PHY processing device where it is buffered. After the key (i.e., the plurality of key values) is entirely loaded into the key register, phase 2 of the RC4 algorithm commences. Due to tight turn around time requirements (e.g., as required by IEEE 802.11), phase 2 often continues until a period of time after the header for the next data frame (frame #2) has begun to be received. However, most of the time for phase 2 occurs during the interframe spacing. Phase 3 (decrypting/encrypting operation for frame #1) will commence while the header for the next data frame (frame #2) is still being received by the MAC processor. However, as shown, due to the tight turn around time; decryption of all data of frame #1 is not completed before the data portion of frame #2 is received. This is due to the long period of time needed to complete phases 1 and 2 using the prior art system as shown in FIG. 2. It should be understood that a different key may be used for each received data frame since the MAC processor may be receiving data from different clients, each having a unique private key.

Figure 3:
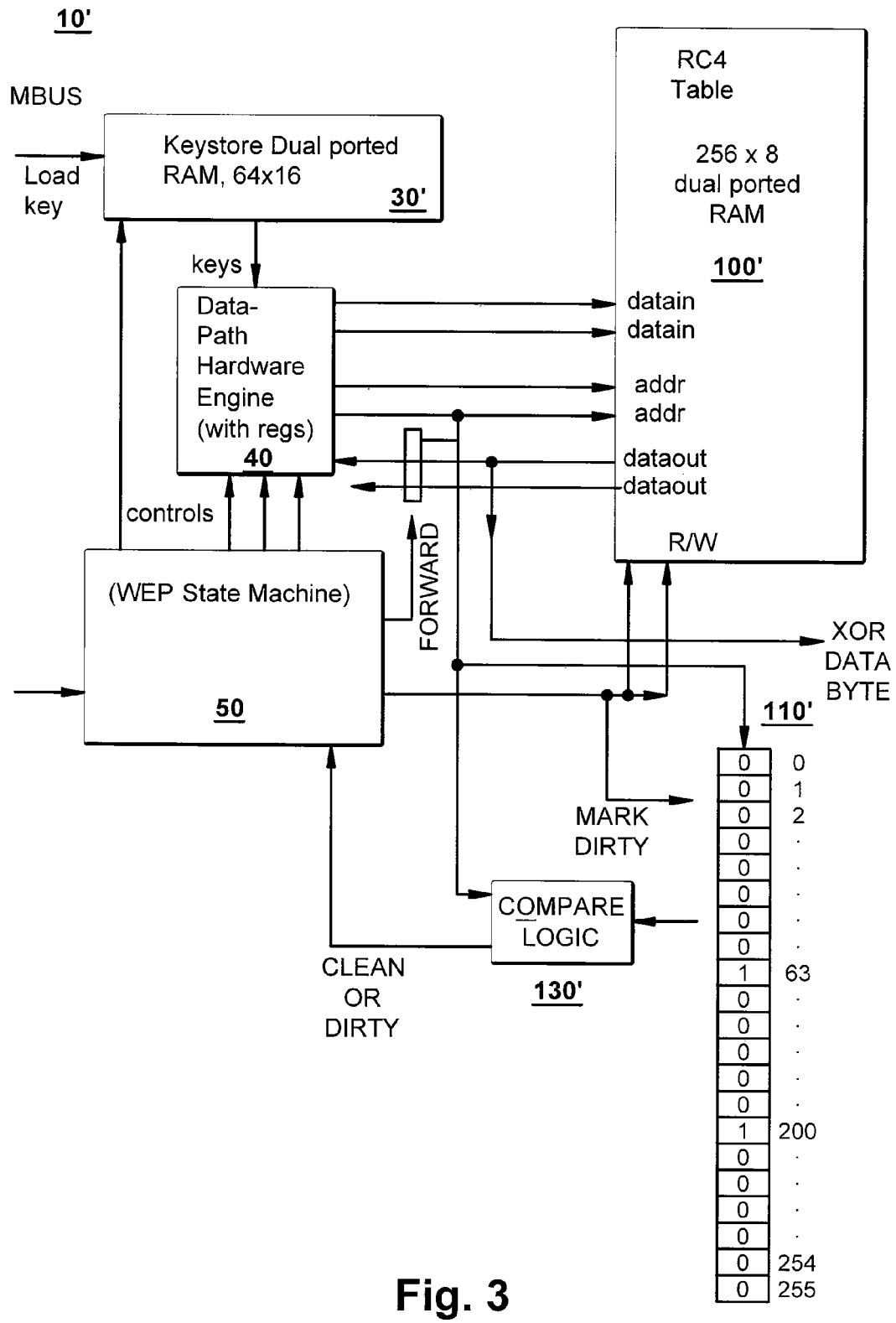
FIG. 3 is a block diagram of a hardware configuration for performing encryption/decryption according to a preferred embodiment of the present invention.

Referring now to FIG. 3, there is shown a modified MAC processor 10', according to a preferred embodiment of the present invention. This embodiment of the invention incorporates a State Machine for control of the WEP algorithm. The present invention reduces the amount of time necessary to complete phases 2a, 2b and 3 of the RC4 algorithm. In this regard, the efficiency of phase 2b and 3 is improved by using a dual ported RAM 100' for the S-box table in place of the single ported S-box used by the prior Art. This allows efficient R/W pipelining of operations allowing the much improved performance. For example, when done efficiently in hardware, it takes 4 R/W memory operations for each of the 256 locations of the S-box to fully scramble the table with the private key. This occurs during the execution of the following loop as shown in this high level code segment:

For i=0 to 255:

$j = (j + S_i + KEY_j) \mod 256$ swap $S_i$ and $S_j$

Using a single ported RAM this will take 1024 clock cycles. However by performing read and write operations for two adjacent loop iterations on different RAM ports the total number of clock cycles can be cut in half as illustrated below:

For i=0 to 127:

| | |
|---|---|
| $J = (J + S_i + KEY_j) \mod 256$ | ;read port 1 |
| $K = (J + S_{i+1} + KEY_{i+1}) \mod 256$ | ;read port 2 |
| swap $S_i$ and $S_j$ | ;read/write port 1 |
| swap $S_{i+1}$ and $S_k$ | ;read/write port 2 |

Total of 512 clock cycles (4 per loop iteration).

With this method, it should be understood that some data "hazards" can occur which result in incorrect computation of the RC4 algorithm. This will happen due to "out of order" execution between simultaneous loop iterations. For example, where a 50$^{th}$ iteration of a write operation to location 3 via port 1 occurs simultaneous with the 51$^{st}$ iteration of a read operation to location 3 via port 2, incorrect data will be read via port 2. This will occur because the 50$^{th}$ iteration (i.e., the write to location 3) has not yet been completed at the time of the read of location 3. Consequently, incorrect (i.e., old) data will be read during the 51$^{st}$ iteration.

However, by detecting the hazard in hardware, the data written to location 3 can be forwarded to the read operation of location 3 to correctly compute the out of order sequence on the same clock cycle. These hazards can be quickly detected and resolved with forwarding (using forwarding logic 120, a simple multiplexing operation), and hence do not result in a reduced performance of the algorithm. Thus, the operation will always complete in 512 clock cycles, regardless of how many data hazards occur.

Furthermore, a "bit table" 110 of 256 bits is used to track which locations have been written during the phase 2b operation, as will be explained in detail below. Consequently, the need for the linear fill of the S-box table (phase 2a) has been completely eliminated, and 256 clock cycles can be saved, with no time cost for this operation. This can be done due to an interesting property of the RC4 algorithm. In this regard, the phase 2a operation prepares all S-box table locations so that all S-box table locations store the value of the S-box location number. Thus, after completion of phase 2a, S-box table location 63 stores data value 63 (i.e., the corresponding location number), and S-box table location 253 likewise stores data value 253. Therefore, when phase 2b commences, it will read the S-box table initialized previously and perform the scramble operation with the private key.

In accordance with a preferred embodiment of the present invention, the bit table has one bit corresponding to each addressed location of the S-box table. This is implemented in the preferred embodiment using a bank of 256 flip flops. Initially, the bit table contents are cleared (e.g., set to zero). The cleared bits may be referred to as "clean" bits. As the content of S-box table locations get scrambled during phase 2b, the initially stored data values are randomly swapped with a data value from a different S-box table location. For example, assume on iteration 2, that S-box table locations 63 and 200 get swapped. Therefore, S-box table location 63 will now store the data value 200, while S-box table location 200 will now store the data value 63. This change is tracked in the bit table by marking bit table location 63 and bit table location 200 as "dirty" (e.g., set corresponding bits to one). This is shown in FIG. 3 with locations 3 and 6 marked as "dirty" with all other locations still "clean."

For each iteration (i.e., before swapping), the bit table is checked using comparison logic 130 for the locations that are to be read from the S-box table. The comparison logic examines the current S-box read address against the current state of the bit table for that memory location. Where a "dirty" bit is indicated in the bit table for an S-box table location, it is known that the location does not contain the "default" data value. Where a "clean" bit is indicated in the bit table for as S-box table location, the address of the S-box table can be used as the data value for the location since that was the initial value after phase 2a. Consequently, it is not necessary to read the contents of the S-box table RAM. It should be appreciated that the foregoing approach eliminates the linear fill operation (phase 2a). The elimination of phase 2a also saves power since there is no need to perform the 256 write operations to fill the table. Also power is saved during phase 2b since read RAM accesses for "clean" bit locations of the S-Box table RAM are eliminated. Bit locations that are marked as "dirty" simply require a read of the S-box table to recover the value for use during the swap operation of phase 2b. This is required for correct operation of RC4 because the location no longer contains the initial value.

The dual-ported S-box table RAM also helps to significantly improve the speed of phase 3 operations, XOR key stream generation. This allows the following four step operation sequence to be performed in 3 clocks cycles, rather than 5 clock cycles when using a single port RAM. In this regard, the $S_i/S_j$ swap "read/write" operation (step 3), and the read $S_i$ and read $S_j$ operations of the final statement (step 4) can be overlapped when mapped to different read/write (R/W) ports.

$i=(i+1) \bmod 256$ ;step 1

$j=(j+S_i) \bmod 256$ ;step 2

Swap $S_i$ and $S_j$ ;step 3 requires two cycles to complete $t=(S_i+S_j) \bmod 256$ ;step 4

It should be appreciated that RAM 100' may take the form of a dual port synchronous memory (clocked), dual port asynchronous memory (non-clocked), or dual port synchronous burst or non-burst memory.

In accordance with a preferred embodiment of the present invention, phases 2 and 3 of the RC4 algorithm use a hardware-based state machine operation and data path hardware engine 40. Data path hardware engine 40 performs the read/write (R/W) operations to the S-box table RAM 100 to prepare the S-box table. These hardware implementations allow a faster clock rate compared to microcode hardware approaches since fetch and decode of microcode is not needed. The preferred embodiment therefore runs two times as fast as the prior embodiment even though the CMOS IC technology is the same physical geometry (e.g. 0.35 micron). Furthermore the present invention requires less intervention from CPU 20 in order to operate.

In summary, the preferred embodiment of the present invention results in an overall initialization (phase 2) speedup of greater than 4 times vs. the prior art. The prior art takes 256 clock cycles for phase 2a and 1024 clock cycles for phase 2b operations. This compares to 512 cycles for phase 2b operations and 0 clock cycles for phase 2a operations. This combined with the doubling of clock speed results in the net speedup experienced. Although described here in the context of receive (decrypt), the same speedups are experienced with the transmit (encryption) algorithm as well since the design and RC4 algorithm is complementary for encryption and decryption. Also the XOR key stream generation (phase 3) runs at 3 cycles as compared to 5 cycles for the prior art.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A method of tracking changes to data locations in a memory, the method comprising:
    setting at least one bit of a bit table to a first state corresponding to an initial configuration of at least one respective data location at an address in the memory;
    marking the at least one bit to track changes in the memory, wherein the step of marking includes changing the state of the at least one bit from the first state to correspond to a respective change in the respective addressed data location; and,
    determining a data value of the addressed data location by:
        i) using the address as the data value of the addressed data location in the event the state of the at least one bit is the first state; and
        ii) reading the addressed data location of the memory in the event the state of the at least one bit is changed from the first state.

2. The method of claim 1 wherein the least one bit comprises a plurality of bits corresponding to a respective plurality of addressed data locations, and wherein:
    the determining comprises determining the first state of only the addressed data locations where the state of the respective bits are not changed; and wherein
    the reading comprises reading only the addressed data locations where the state of the respective bits are changed.

3. The method of claim 2 wherein the setting comprises setting the plurality of bits corresponding to a respective number of addressed data locations in a memory.

4. The method of claim 2 further comprising clearing the at least one bit to an initial configuration corresponding to a respective initial state of the respective at least one respective addressed data location.

5. A bit table embodied in a processor, the bit table for tracking changes in data locations, comprising:
- at least one bit corresponding to at least one respective data location at an address in a memory;
- a setting implementation for clearing the at least one bit to an initial configuration corresponding to a respective initial state of the respective at least one respective addressed data location;
- a marking implementation for tracking changes in the memory, wherein the marking implementation changes the state of the at least one bit from the initial configuration, to correspond to a respective change in the respective addressed data location, wherein an initial configuration of the addressed data location is presumed unless a respective corresponding change in the bit table is indicated; and,
- a reading implementation coupled to the memory, wherein the reading implementation is: i) configured to read the memory to determine a data value at the addressed data location in the event the corresponding at least one bit is not set to the initial configuration, and ii) configured to use the address as the data value at the addressed data location in the event the corresponding at least one bit is set to the initial configuration.

6. The bit table embodied in a processor of claim 5 wherein the at least one bit comprises 256 bits corresponding to a respective number of addressed data locations in a memory.

7. The bit table embodied in a processor of claim 5 wherein the at least one bit comprises a flip flop.

8. The bit table of claim 5, wherein the reading implementation is configured to use the address as the data value without reading the memory in accordance with the corresponding at least one bit is being in the initial configuration.

9. The bit table of claim 5, wherein the at least one bit comprises a plurality of flip flops corresponding to a respective plurality of addressed data locations in a memory.

10. The bit table of claim 5 wherein the at least one bit comprises a plurality of bits corresponding to a respective plurality of addressed data locations in a memory.

11. A method of tracking changes to data locations in a memory using a bit table having at least one bit corresponding to an initial configuration of at least one respective data location at an address in the memory, comprising:
- marking the at least one bit to track changes in the memory, wherein the step of marking includes changing the state of the at least one bit to correspond to a respective change in the respective addressed data location; and,
- determining a data value for the addressed data location i) based on the address and without reading the memory in the event the state of the at least one bit is not changed wherein the address is used as the data value for the addressed data location; and ii) by reading the addressed data location in the event the state of the at least one bit is changed wherein the data at the addressed data location is used as the data value for the addressed data location.

12. The method of claim 11 wherein the least one bit comprises a plurality of bits corresponding to a respective plurality of addressed data locations, and wherein:
- the step of determining the data value comprises determining a data value for the addressed data location based on the address and without reading the memory of only the addressed data locations where the state of the respective bits are not changed; and reading only the addressed data locations where the state of the respective bits are changed.

13. The method of claim 12 wherein the plurality of bits comprises 256 bits corresponding to a respective number of addressed data locations in a memory.

14. The method of claim 12 further comprising a step of clearing the at least one bit to an initial configuration corresponding to a respective initial state of the respective at least one respective addressed data location.

15. A system for tracking changes to data locations in a memory, comprising:
- a bit table means for associating at least one bit to a respective at least one data location at an address in the memory;
- means adapted for setting an initial configuration of the at least bit;
- means adapted for marking the at least one bit to track changes in the memory, wherein the means adapted for marking includes means for changing the state of the at least one bit from the initial configuration, to correspond to a respective change in the respective addressed data location;
- means adapted for determining a data value of the addressed data location by using the address as the data value of the addressed data location in the event the state of the at least one bit is not changed; and
- means adapted for reading the addressed data location in the event the state of the at least one bit is changed.

16. The system of claim 15, further comprising:
- the bit table means comprises a plurality of bits corresponding to a respective plurality of addressed data locations,
- wherein the means adapted for determining further comprises means for determining the data value of the addressed data location by using the address as the data value of only the addressed data locations where the state of the respective bits are not changed; and
- wherein the means adapted for reading comprises means adapted for reading only the addressed data locations where the state of the respective bits are changed.

17. The system of claim 16, wherein the plurality of bits comprises 256 bits corresponding to a respective number of addressed data locations in a memory.

18. The system of claim 16 further comprising means adapted for clearing the at least one bit to an initial configuration corresponding to a respective initial state of the respective at least one respective addressed data location.

19. A method of tracking changes to data locations in a memory, the method comprising:
- setting at least one bit of a bit table to a first state corresponding to an initial configuration of at least one respective data location at an address in the memory;
- marking the at least one bit to track changes in the memory, wherein the step of marking includes changing the state of the at least one bit from the first state to correspond to a respective change in the respective addressed data location; and,
- based on the state of the at least one bit, without reading the addressed data location, determining a data value for the addressed data location by selectively using the address of the memory as the data value for the addressed data location based on the state of the at least one bit.

20. The method of tracking changes to data locations in a memory according to claim 19, wherein the determining includes:
- using the address as the data value in the event the state of the at least one bit is the first state; and
- reading the addressed data location in the event the state of the at least one bit is changed from the first state.

* * * * *